US008092728B2

(12) United States Patent
Hampel

(10) Patent No.: US 8,092,728 B2
(45) Date of Patent: Jan. 10, 2012

(54) SKID BASE FOR PORTABLE BUILDING

(76) Inventor: Lance T. Hampel, Land O'Lakes, WI (US)

( * ) Notice: Subject to any disclaimer, the term of this patent is extended or adjusted under 35 U.S.C. 154(b) by 0 days.

(21) Appl. No.: 12/122,445

(22) Filed: May 16, 2008

(65) Prior Publication Data

US 2008/0210141 A1 Sep. 4, 2008

Related U.S. Application Data

(63) Continuation of application No. 10/781,129, filed on Feb. 18, 2004, now Pat. No. 7,373,757, which is a continuation-in-part of application No. 10/195,680, filed on Jul. 12, 2002, now Pat. No. 6,823,639, which is a continuation-in-part of application No. 09/504,513, filed on Feb. 15, 2000, now Pat. No. 6,418,672.

(60) Provisional application No. 60/488,567, filed on Feb. 19, 2003, provisional application No. 60/346,641, filed on Jan. 8, 2002, provisional application No. 60/120,828, filed on Feb. 19, 1999.

(51) Int. Cl.
*B29C 67/00* (2006.01)

(52) U.S. Cl. ......... 264/46.4; 52/177; 52/143; 108/51.11

(58) Field of Classification Search .................... 52/177, 52/180, 664, 143, 53; 4/462, 459, 461, 476, 4/449; 108/51.11; 264/46.4, 51
See application file for complete search history.

(56) References Cited

U.S. PATENT DOCUMENTS

| | | | | |
|---|---|---|---|---|
| 3,139,627 | A | | 7/1964 | Rice |
| 3,581,709 | A | | 6/1971 | Van Huis et al. |
| 3,685,464 | A | * | 8/1972 | Ranno ........................ 108/57.26 |
| 3,702,100 | A | * | 11/1972 | Wharton ...................... 108/53.3 |
| 3,795,206 | A | * | 3/1974 | Utz ............................ 108/57.28 |
| 3,915,098 | A | * | 10/1975 | Nania ........................ 108/57.28 |
| 3,916,803 | A | * | 11/1975 | Garcia ....................... 108/57.28 |
| 4,305,164 | A | | 12/1981 | Sargent et al. |
| 4,367,255 | A | | 1/1983 | Blohm |
| 4,380,836 | A | | 4/1983 | Braxton |

(Continued)

*Primary Examiner* — Eileen D Lillis
*Assistant Examiner* — Alp Akbasli
(74) *Attorney, Agent, or Firm* — Steven J. Wietrzny; Quarles & Brady LLP

(57) ABSTRACT

A molded plastic skid base for a resin building is formed with all of its openings facing downward and with runners integral with a deck that forms a floor of the base. Replaceable wear plates cover the bottoms of the runners and have truck loading notches molded at their ends and a longitudinal channel in which fastener heads are positioned. Stake down slots are provided in the ends of the runners and wear plates in a diagonal orientation so as to be aligned toward the center of the building, below the base. The floor of the base is a grid formed of diagonally oriented ribs, at least some of which may be shorter in their center than at their ends, is crowned in the center and has openings which taper upwardly. A solid sheet may be placed over the grid to close it. Bosses for receiving the wear plate mounting fasteners are positioned at the same locations along the sides of the base as the fastener mounting locations for attaching the building side walls to the base, to provide a greater thickness of material at those locations for the building sidewall fasteners to penetrate. Edges of a septic tank opening formed in the base are slanted downwardly and rear corners of the opening are triangular in shape. Downwardly opening openings are also formed in the base into which weights and weight covers may be fixed.

20 Claims, 12 Drawing Sheets

U.S. PATENT DOCUMENTS

| | | | | | |
|---|---|---|---|---|---|
| 4,423,528 | A | | 1/1984 | Wiedmeier | |
| 4,446,585 | A | | 5/1984 | Harding et al. | |
| D275,520 | S | | 9/1984 | Harding et al. | |
| 4,493,118 | A | | 1/1985 | Braxton | |
| 4,574,025 | A | | 3/1986 | Juaire et al. | |
| 4,756,413 | A | * | 7/1988 | Gits | 206/318 |
| 4,831,671 | A | | 5/1989 | Harding | |
| 5,251,342 | A | | 10/1993 | Sansom et al. | |
| 5,372,396 | A | | 12/1994 | Van Nahmen | |
| 5,560,050 | A | * | 10/1996 | Tagg | 4/449 |
| 5,619,826 | A | | 4/1997 | Wu | |
| 5,687,652 | A | * | 11/1997 | Ruma | 108/57.25 |
| 5,758,462 | A | * | 6/1998 | Finn | 52/302.1 |
| 5,873,679 | A | | 2/1999 | Cusimano | |
| 5,937,767 | A | * | 8/1999 | Togawa et al. | 108/57.26 |
| 5,974,597 | A | | 11/1999 | Conwell | |
| 6,047,663 | A | * | 4/2000 | Moreau et al. | 119/529 |
| 6,131,983 | A | | 10/2000 | Jackson | |
| 6,164,214 | A | * | 12/2000 | Smorgon et al. | 108/53.5 |
| 6,308,486 | B1 | | 10/2001 | Medland | |
| 6,327,719 | B1 | | 12/2001 | Lobertmann et al. | |
| 6,418,672 | B1 | | 7/2002 | Hampel | |
| 6,427,256 | B1 | | 8/2002 | Mullett et al. | |
| 6,508,182 | B1 | * | 1/2003 | Smorgan et al. | 108/57.28 |
| 6,619,002 | B2 | | 9/2003 | Pettit | |
| 6,823,639 | B2 | | 11/2004 | Hampel | |
| 2002/0016986 | A1 | * | 2/2002 | Miller et al. | 4/300 |
| 2004/0069190 | A1 | * | 4/2004 | Smyers | 108/56.1 |

* cited by examiner

Fig. 12A
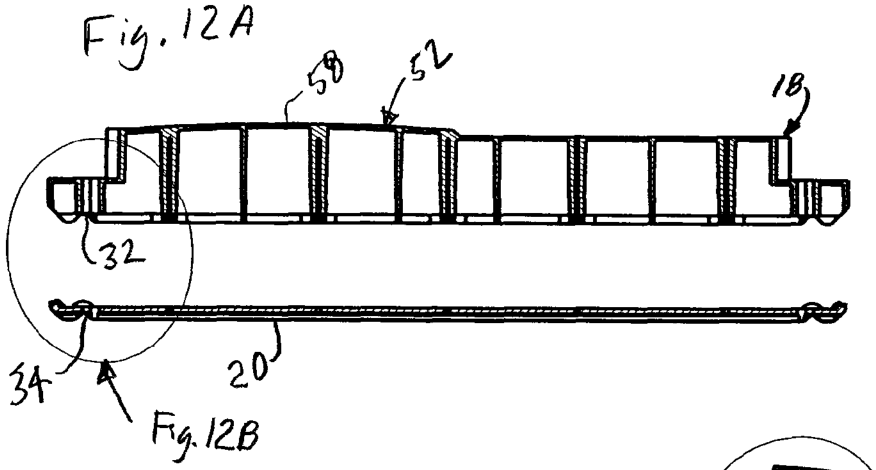
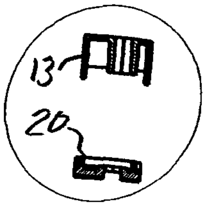
Fig. 12B
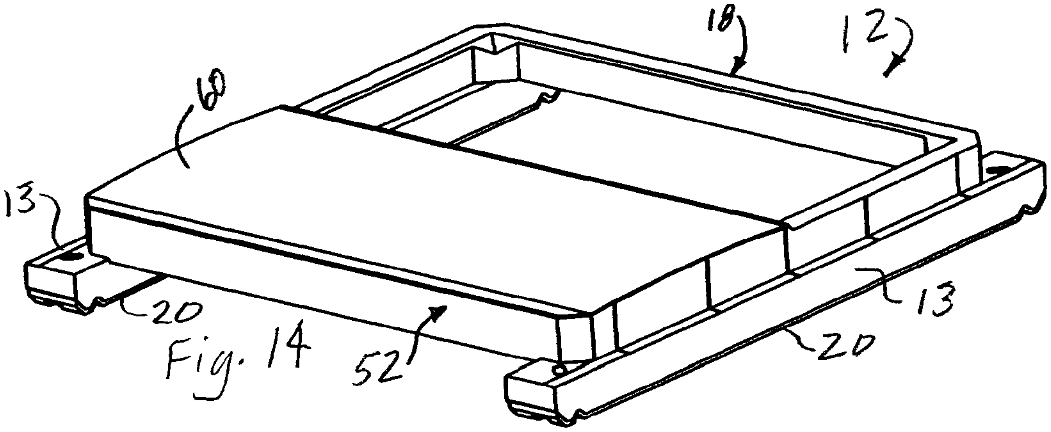
Fig. 14
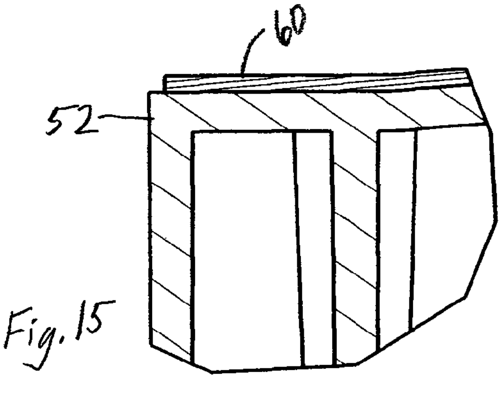
Fig. 15

SKID BASE FOR PORTABLE BUILDING

CROSS-REFERENCE TO RELATED APPLICATION

This application is a continuation of U.S. patent application Ser. No. 10/781,129 filed Feb. 18, 2004, issuing as U.S. Pat. No. 7,373,757 on May 20, 2008, which claims the benefit of U.S. Provisional Patent Application No. 60/448,567 filed Feb. 19, 2003 and is a continuation-in-part of U.S. patent application Ser. No. 10/195,680 filed Jul. 12, 2002, issued as U.S. Pat. No. 6,823,639 on Nov. 30, 2004, which is hereby incorporated by reference, and which claims the benefit of U.S. Provisional Application No. 60/346,641 filed Jan. 8, 2002, and is a continuation-in-part of U.S. patent application Ser. No. 09/504,513 filed Feb. 15, 2000, issued as U.S. Pat. No. 6,418,672 on Jul. 16, 2002, and which claims the benefit of U.S. Provisional Application No. 60/120,828 filed Feb. 19, 1999.

STATEMENT CONCERNING FEDERALLY SPONSORED RESEARCH OR DEVELOPMENT

Not applicable.

FIELD OF THE INVENTION

This invention relates generally to a plastic resin building, for example, an outhouse or bus stop, and in particular to a skid base for such a building.

BACKGROUND OF THE INVENTION

Outdoor shelter structures, such as portable outhouses, are commonly rented and used for special events, such as parties, festivals or concerts, as well as at job sites or other locations where people are gathered temporarily. These shelters are moved to and from the site on a truck typically, and while at the site they may be pumped out occasionally, to empty their septic tanks. While at the site, they must be stable, and not susceptible to tipping over, or being tipped over by the wind or by vandals.

These shelters must be rugged and durable, and since they must be moved manually, most operators who rent these out (a.k.a., pumpers) prefer them to be light in weight. A minority want them heavy, so as to counter any tendency to tip over. The buildings must be movable on and off of the truck, but once off of the truck, a single person should be able to move the building across the ground to position it in the desired location. The buildings also must be low in cost.

It is common to form much of these outdoor shelters of plastic resin. One exception, however, has been the base on which the remainder of the building is built. The bases are typically a composite structure of plastic and wood. The bases also usually have several main structural components, which can adversely affect their strength and rigidity.

Another common problem has been the connections between the shelter walls and the base. While plastic components in the base are preferable to wood for aesthetics, cleanliness and durability, the fastener holding ability of plastic base components has often been lacking. Sheet metal screws are typically used to secure the shelter walls to the base. The stresses at these fastener locations can be great when moving the shelter, under heavy winds, or when forces are applied to the walls, especially with a person in the shelter or with a full septic tank. Failure of the base to hold the fasteners can result in troublesome or costly repairs or complete replacement of the base or whole shelter.

SUMMARY OF THE INVENTION

The present invention provides a resin skid base for a portable building that overcomes the aforementioned problems.

A skid base of the invention has a deck with top and bottom surfaces, and front, rear, right, left and side surfaces between the top and bottom surfaces, the skid base being adapted to mount walls of a building structure that extend above and enclose the top surface of the deck. The skid base has at least two runners that are generally parallel and spaced apart and extend beneath the deck, each runner having a bottom surface to support the deck above a support surface. The runners and the deck are molded in one piece so as to be integral with one another and have openings in their bottom surfaces that open downwardly. This provides a skid base that is enclosed on all sides but the bottom. The bottom of the base is not visible in normal use as it faces the ground, and can be formed with reinforcement ribs and covered with other parts if necessary, which can be replaceable.

The invention may be applied to skid bases that may be used for buildings with different purposes, such as outhouses, bus stop shelters, ticket booths, sentry huts and storage sheds. If used as an outhouse, the base supports a septic tank, and the base is shaped to match the bottom of the tank which is sloped toward a central, low point of the tank to facilitate pumping out the tank.

Thus, the invention provides an improved resin skid base for a portable building that can be used for many purposes. The base is easy to assemble and disassemble to the remainder of the building and is lightweight with all of its main structural components integrally formed in one piece for excellent strength and rigidity. Runners of the base have solid vertical walls and have openings in the bottoms in which reinforcing ribs are formed. A bottom plate is assembled to the skid over the opening to close the opening and provide a continuous surface to slide over the ground like a ski, to facilitate moving the building over the ground. Notches are formed into the runner sidewalls and in the bottom plates to catch on the edge of a truck so the building can be more easily loaded onto and unloaded from the truck. The bottom plates also have a longitudinal groove in which the fastener heads that hold the plate to the runner are countersunk, that rigidifies the runner and plate, and that reduces friction when the building is slid over the ground. The runners and plates also have stake down slots to allow anchoring the building with stakes at an angle and reinforcing ribs in the plates in the areas of the truck loading notches.

In another aspect of the invention, an open grate-type floor is molded into and integrally part of the deck. This is ideal for construction sites or outdoor concert-type events where a lot of dirt is carried on the bottom of the user's shoes into the building. It also helps keep the building clean in normal use, as fluids and small objects can drop through the grate. Ventilation is also improved through the grate. When a solid floor is required, a thin sheet of plastic can be placed over the grate to close it.

Preferably, the floor is crowned in the center to allow liquids to run off if the open grating is covered with the plastic sheet.

In addition, the openings in the grating are preferably tapered such that if anything is dropped or forced into the hole from the top, it is assured of dropping down through the bottom. The webbing, or ribs, that create the grating are taller at the perimeter of the floor than at the center to save weight and maintain strength.

Another feature of the invention is that it is provided with cabin mounting fastener locaters. These are lines molded into the sides of the upper base and on the top surface of the runners to show where to put the threaded fasteners to mount the cabin wall panels. The material of the base is thicker in these places. In addition, bosses that provide fastening points for the fasteners that secure the wear plates to the runners can be coincident in location to these places.

In one preferred form, the base is adapted for use as the base of a portable restroom, and in that case, the surface of the base that supports the waste or septic tank is molded to conform to the bottom of the tank. The bottom of the tank is slanted downwardly toward a central point in the bottom of the tank. There are, therefore, no flat surfaces or pockets to prevent complete drainage to the bottom of the tank, which facilitates pumping the waste out of the tank. In addition, in this embodiment, there may be provided triangular-shaped reinforcements at the corners, to give the base unit corners strength and dimensional stability. Preferably, these reinforcements are also sloped down to match the shape of the septic tank.

A base of the invention may be injection molded using high density polyethylene structural foam material, in which case it would be relatively light in weight. Many pumpers prefer a light weight structure, for ease of transport. However, there are some who prefer it to be heavier. To satisfy them, additional weight bars, for example, made of iron or another heavy material, can optionally be added to the base, and in addition weight covers may be provided to cover the weights or to close up the bottom of the base if so desired.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 12A is a sectional view taken along line 12A-12A of FIG. 2 with the bottom plate exploded from the runner of the base;

FIG. 12B is a cross-sectional detail view of the indicated portion of FIG. 12A, taken at 90° from the plane of FIG. 12A;

FIG. 14 is a perspective view of the base with a plastic sheet covering the grates of the deck;

FIG. 15 is a detail fragmentary cross-sectional view showing the plastic sheet on top of the deck;

DETAILED DESCRIPTION OF THE PREFERRED EMBODIMENTS

Figure 1:
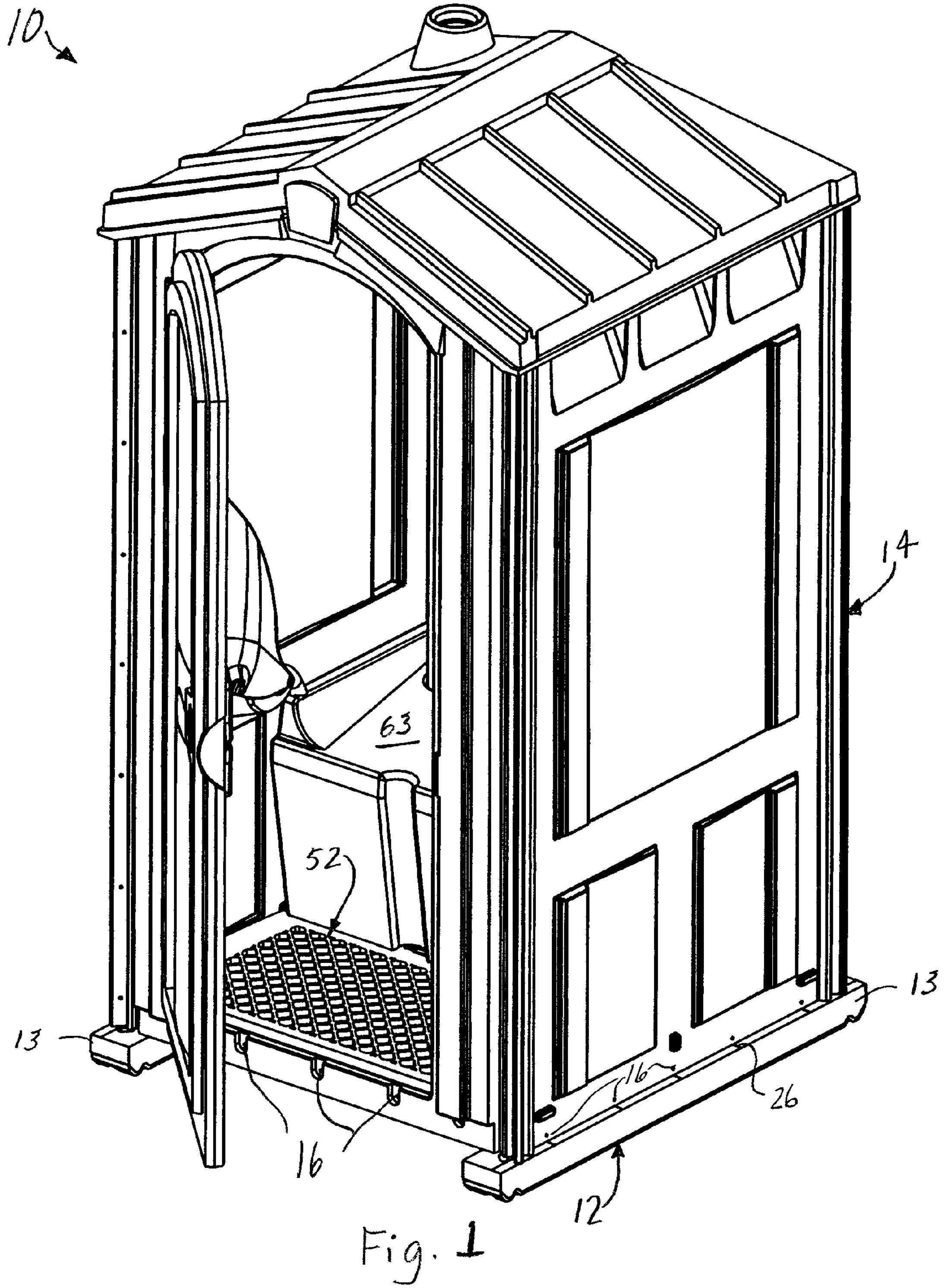
FIG. 1 is a right front perspective view of a portable restroom incorporating a base of the invention.

FIG. 1 illustrates a resin building 10 which as illustrated is a portable outhouse, and includes a base 12 of the present invention and a cabin 14 having sides and a roof, the cabin 14 being bolted to the base 12 with fasteners 16 on both sides thereof, and optionally also on the front and back.

The cabin 14 may be of any suitable construction and is not limited to being a portable outhouse. For further details about the construction of a suitable cabin 14, reference is made to U.S. patent application Ser. No. 10/195,680 (US Patent Publication No. 2003/0024191 published Feb. 6, 2003) and to U.S. Pat. No. 6,418,672, which are incorporated herein by reference.

Referring to FIGS. 2-9, the base 12 has a deck 18 integral with two spaced apart generally parallel runners 13 that are molded integrally in one piece with the deck 18 by an injection molding process using high density polyethylene structural foam. High density polyethylene structural foam is preferred since it is a strong and relatively lightweight plastic material which can be molded using aluminum molds, which are considerably less expensive than steel molds. Impact modifiers such as ethyl vinyl alcohol (EVA) may be added to the material to improve impact resistance, other additives may be added for other properties, or a different basic material such as low density polyethylene or another material may be used.

One preferred aspect of the base design is the direction that the mold splits apart to yield a base that is formed on all sides with molded surfaces (top, front, rear, left and right sides) except the bottom side. The bottom side of the base (i.e., the bottom sides of the deck 18 and runners 13) is not visible in normal use as it faces the ground. In addition, the openings on the bottom of the base, where they are important, can be closed up with other parts, that can be replaced when they wear out. Another advantage of making the openings on the bottom of the base is that numerous structural reinforcement ribs can be provided, which serve to strengthen the various portions of the base, as illustrated in FIGS. 2-9.

Figure 21:
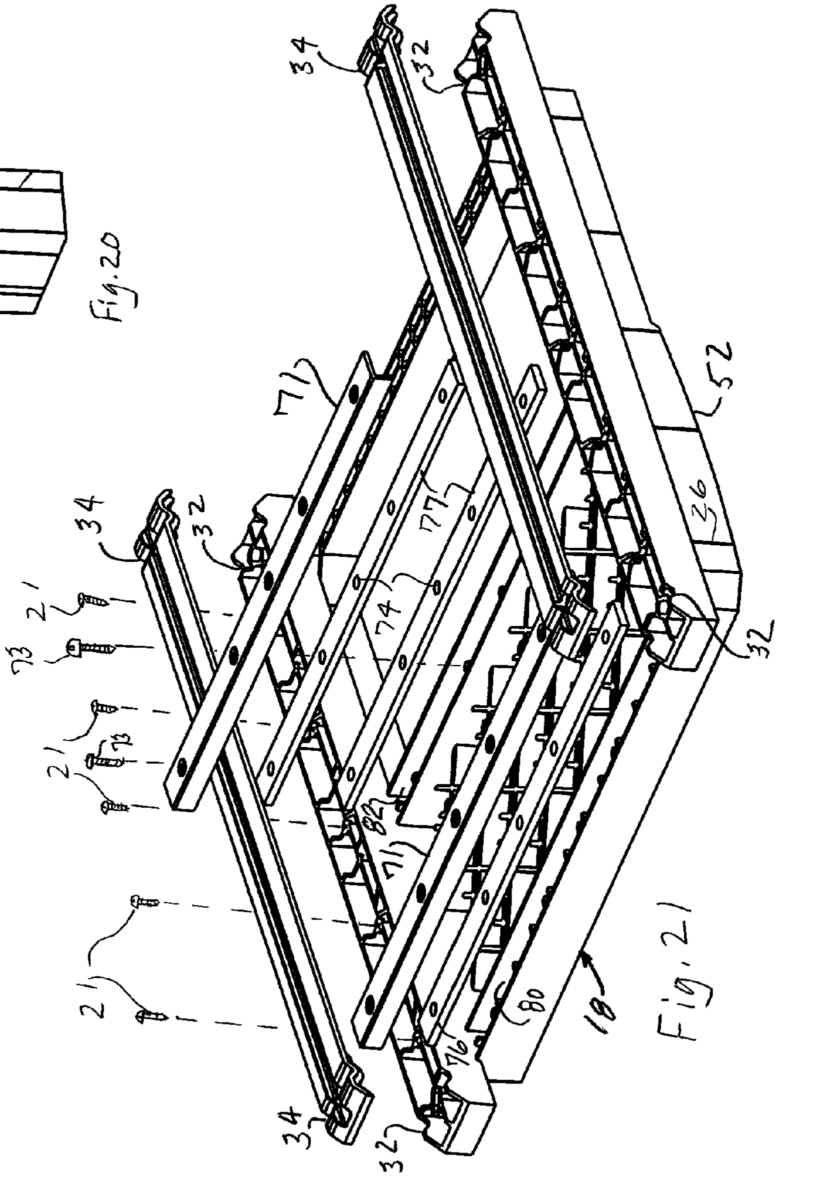
FIG. 21 is a bottom exploded perspective view of the base illustrating the bottom plates, weights and weight covers exploded from the base.
Figure 19:
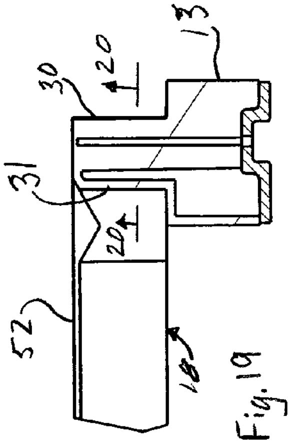
FIG. 19 is a cross-sectional view from the plane of the line 19-19 of FIG. 2.

As shown in FIGS. 10-13B and 21, a wear plate 20 is provided which covers the bottom opening of each runner 13. The runner wear plate 20 is smooth on the bottom so that it can be pushed over an uneven ground surface. The wear plate 20 closes the opening in the bottom of the runners 13 to cover the numerous ribs and webs placed throughout the runners 13 for strength. Without the runner wear plates installed, these webs and ribs would be visible and the skid base would not be functional, i.e. it would be too hard to push the building over an uneven ground surface. The runner wear plates 20 can also be replaced should they become too worn down or damaged. The runner wear plates 20 are affixed to the runners 13 by self threading fasteners 21 (FIG. 21, shown on only one side) extending through the holes 22 (FIG. 11) into the holes 24 (FIG. 9), five or so of which are provided for each wear plate/runner. More (or less) may be added, depending on how many are desired or needed to hold the wear plates 20 on.

At each location where a hole 24 is formed, there are lines 26 (e.g., small grooves) molded into the sides of the deck 18 and on the top surface of the runners 13 to show where to put the threaded fasteners for mounting the cabin panels, i.e. for mounting the cabin front, sides, and rear. The structural foam material of the deck 18 is thicker in these locations, a result of the placement of the bosses 28 that contain the holes 24 that provide the fastening points for the runner wear plates 20. Referring to FIG. 8 and FIGS. 17-20, the generally cylindrical boss 28 in which the hole 24 is formed, extends all the way to the underside of the top of the base so as to substantially fill the void on the inside of side wall 30 at the location of line 26. Thereby, a self threading fastener 16 can be driven into the side wall 30 at the line 26 and be substantially fully engaged to a depth significantly greater than the thickness of the sidewall 30 by the material of the deck 12, i.e., to a depth approximately equal to the lateral dimension of the boss 28. Triangular reinforcing structures provided by ribs 29 (FIG. 9) provide additional reinforcement by tying the bosses 28 into the inner sidewall 31, and provide additional thickness where the ribs 29 intersect the boss 28 for the fasteners 16 to penetrate.

In addition, referring particularly to FIGS. 11, 12A, 12B, 13A, 13B and 21, each end of each runner 13, and in the corresponding locations of each wear plate 20, a notch 32 in the runners 13 and notch 34 in the wear plates 20 is formed which serves as a truck mounting notch. As is known in the art, these notches are used for hooking onto the edge of a truck or trailer bed to keep the building from slipping while loading and unloading. Solid ribs 36 and 38 are formed in the areas of the notches 34 to strengthen the wear plates 20 and runners 13 in these locations. In addition, elongated stake down slots 40 and 42 are provided at each corner of the respective runner 13 and wear plate 20 which are diagonally oriented to provide the maximum holding power of the stakes. By making them elongated and diagonally oriented, the stakes can be driven in at an angle toward the center of the restroom oblique to the natural tipping direction of the restroom, to hold the restroom against the ground in high wind or when vandals are trying to tip it over.

Figures 13A, 13B:
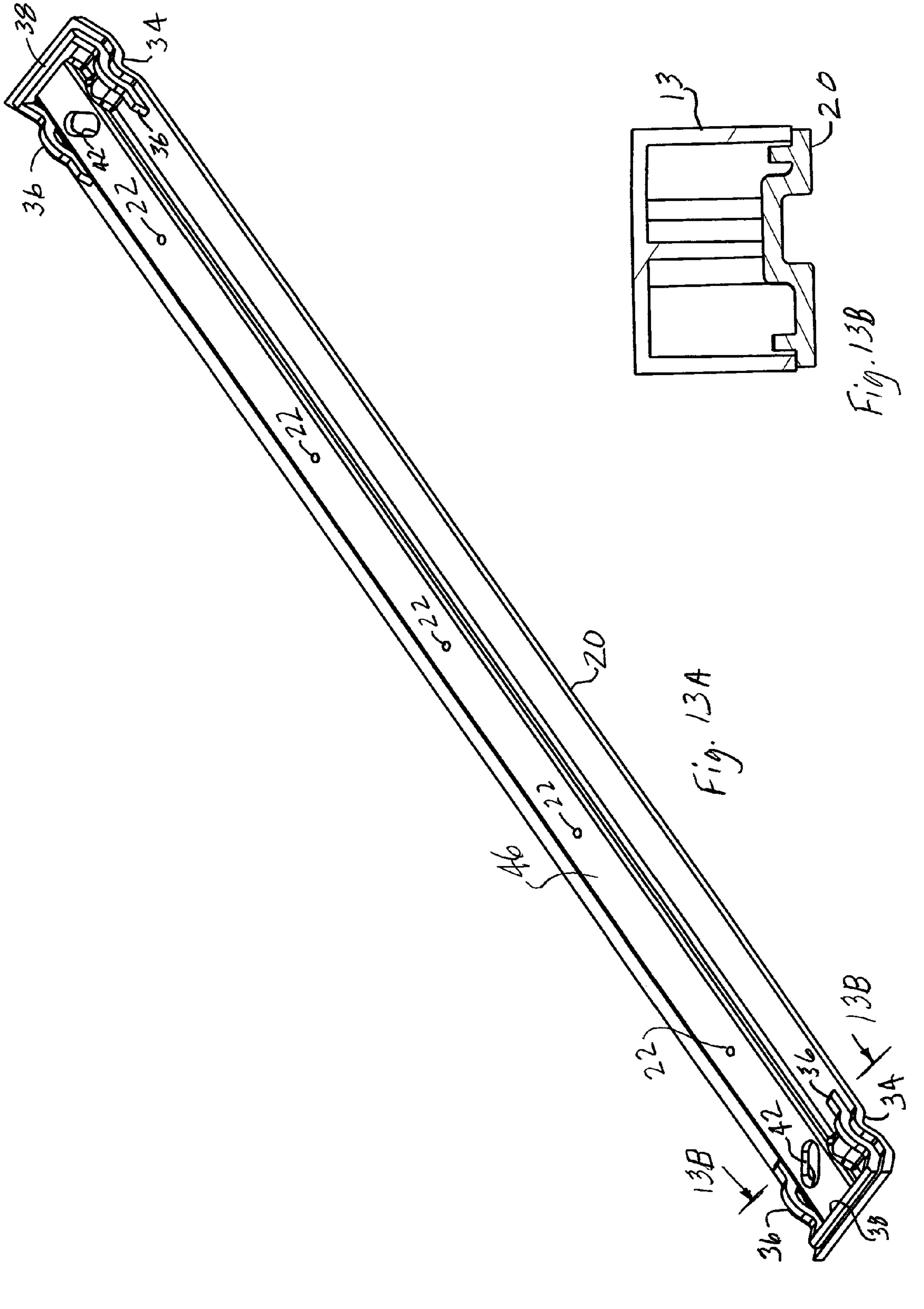
FIG. 13A is a top perspective view of the bottom plate.
FIG. 13B is a cross-sectional view from the plane of the line 13B-13B of FIG. 13A, with the bottom plate mounted on the base.
Figure 18:
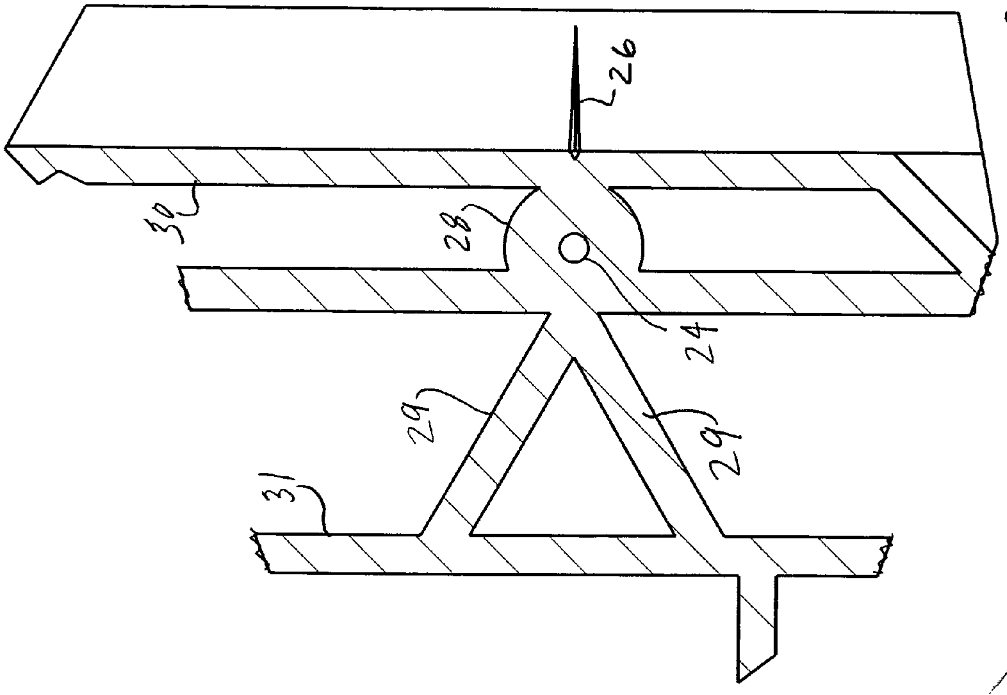
FIG. 18 is a detail view of the indicated portion of FIG. 17.
Figure 16:
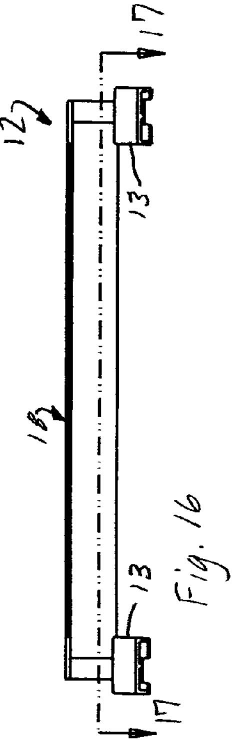
FIG. 16 is a front plan view of the base.
Figure 17:
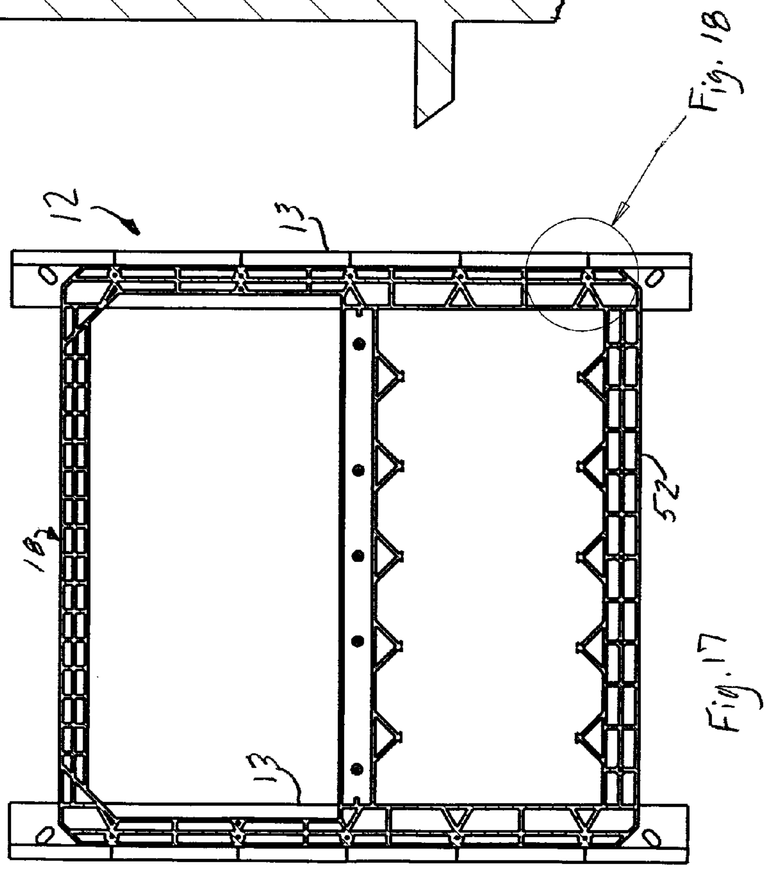
FIG. 17 is a cross-sectional view of the base from the plane of the line 17-17 of FIG. 16.
Figure 20:
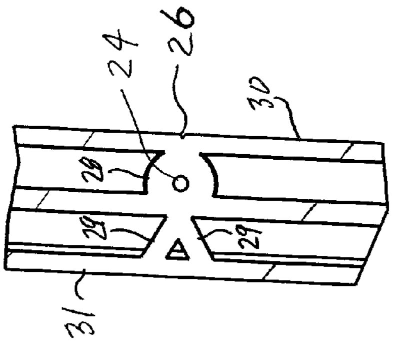
FIG. 20 is a cross-sectional view from the plane of the line 20-20 of FIG. 19.

In addition, referring particularly to FIG. 13A, the wear plate 20 has a longitudinally running channel 46 that runs for the length of the wear plate. The channel 46 acts as a stiffening shape, without adding significant material thickness to the wear plate 20. Since it is indented on the bottom surface of the runner 20, the channel 46 also reduces the contact with the ground thereby making it easier to move the building 10 when sliding it along the ground on the wear plates 20. The channel 46 also provides a countersink area for the heads of the fasteners 21 which are used to hold the wear plates 20 to the runners 13.

It should be noted that the base 12, the wear plates 20, and also optional weight cover plates 71 which can be provided over the weight holding areas of the base 12, described below, can be molded in a single family mold, all at the same time. The skid base 12 can be made in a standard size, for example, a 41 inch by 41 inch industry standard size, which will fit most portable restrooms produced currently.

Another preferred feature of the base 12 is that the deck 18 is provided with a grate style floor 52 that has a grid of openings formed in it. Since one mold half is inserted into the bottom of the base, and the other mold half forms the top of the base, the draft on the bottom mold half makes the openings of the grate larger at the bottom than at the top, so that anything falling through the grate 52 from the top will be sure to fall all the way through and not get caught in the bottom of an opening. In addition, referring particularly to FIG. 9, it is noted that some of the ribs that form the grate are of constant height for their length, for example, the ribs 50, and others, the ribs 53, are arched so that they are of smaller height in their central portions than at their ends. Making the ribs or webbing that creates at least some of the grating ribs higher at the perimeter than at the center saves weight while at the same time maintaining strength in the grate style floor 52. Alternatively, the ribs 53 could be made of a uniform height for their length, or the bottoms of the ribs 53 could be all at the same height (in the same plane), like the ribs 50.

Another advantage of the grate style floor 52 is that it improves ventilation through the building, which is particularly important when it is used as an outhouse, and as mentioned above, dirt, rocks and urine falls through the grate 52.

Referring to FIG. 12, the upper surface 58 of the grate style floor 52 is arched or crowned in the front to back direction to allow liquids to run off, which is particularly important if the open grating is covered with a plastic sheet, as may be done as shown in FIG. 14, the sheet being referred to as item 60. The sheet 60 may be desirable if anyone with high heels may be expected to use the building, or if the building is used for something other than a restroom, particularly in cold weather.

Figure 2:
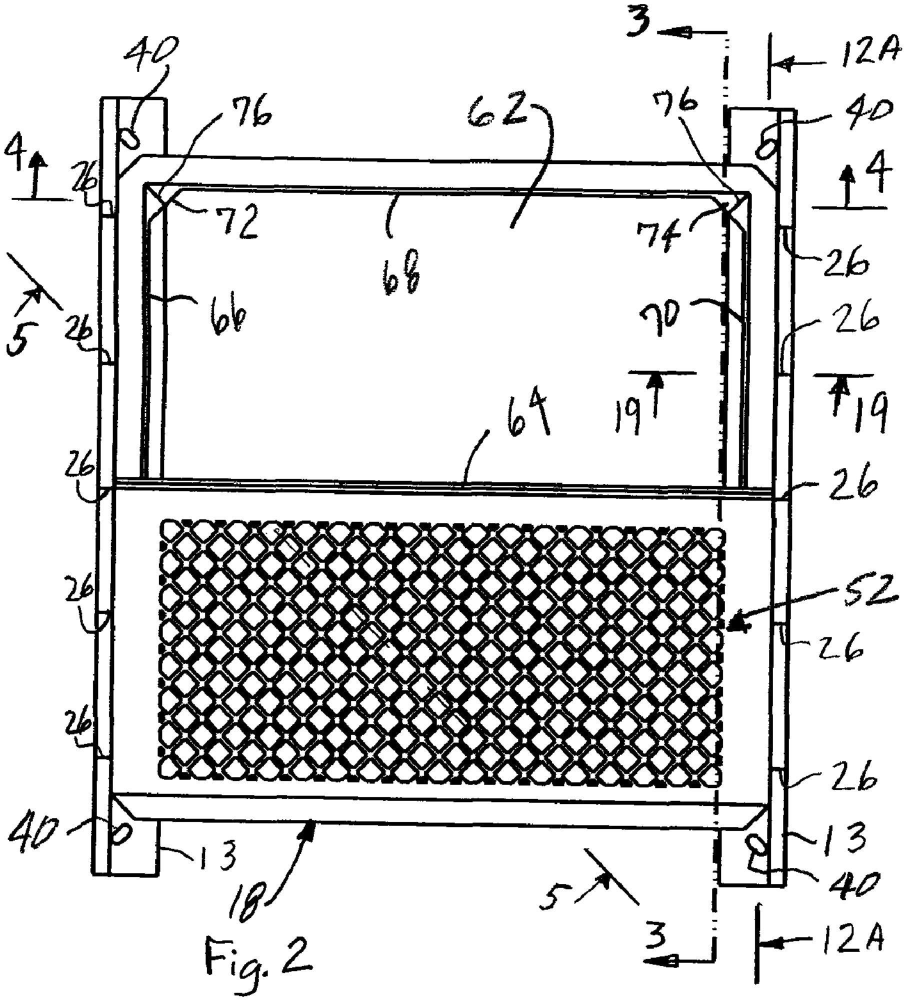
FIG. 2 is a top plan view of the base alone.
Figure 3:
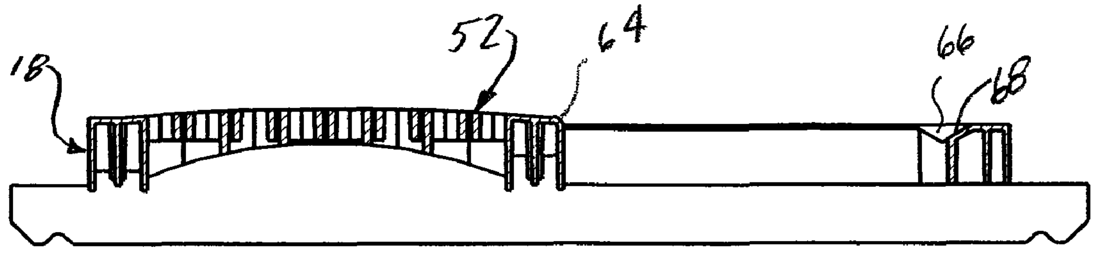
FIG. 3 is a cross-sectional view taken along the plane of the line 3-3 of FIG. 2.
Figure 4:
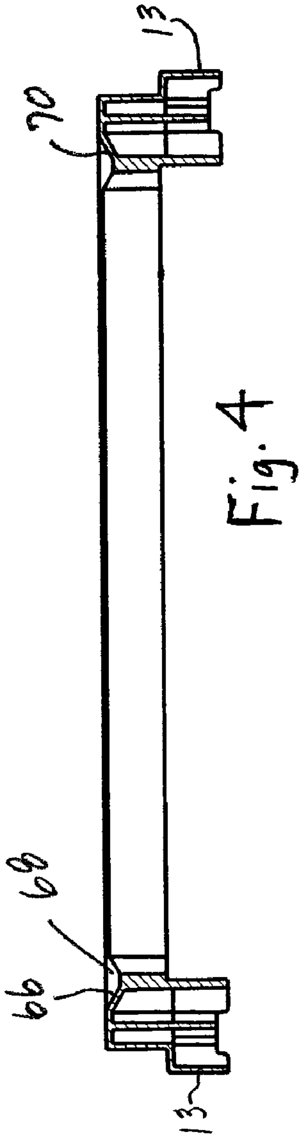
FIG. 4 is cross-sectional view taken along the plane of the line 4-4 of FIG. 2.
Figure 5:
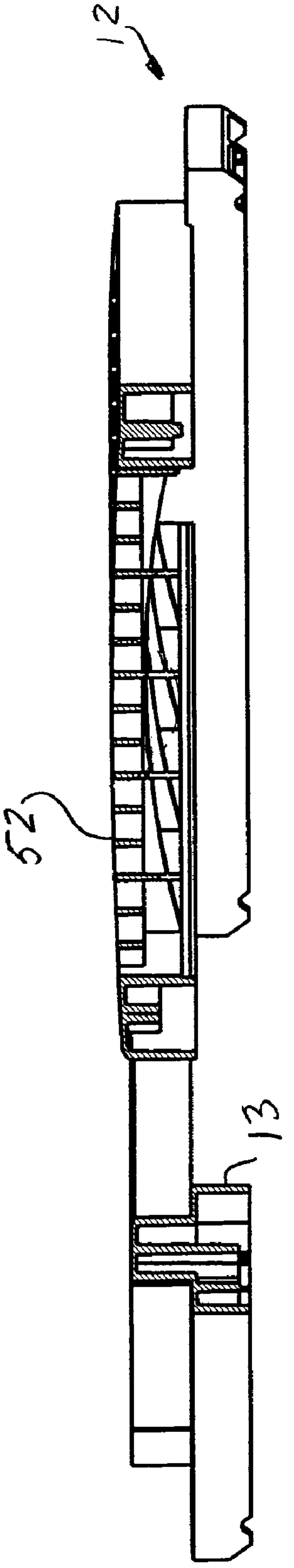
FIG. 5 is cross-sectional view taken along the plane of the line 5-5 of FIG. 2.
Figure 6:
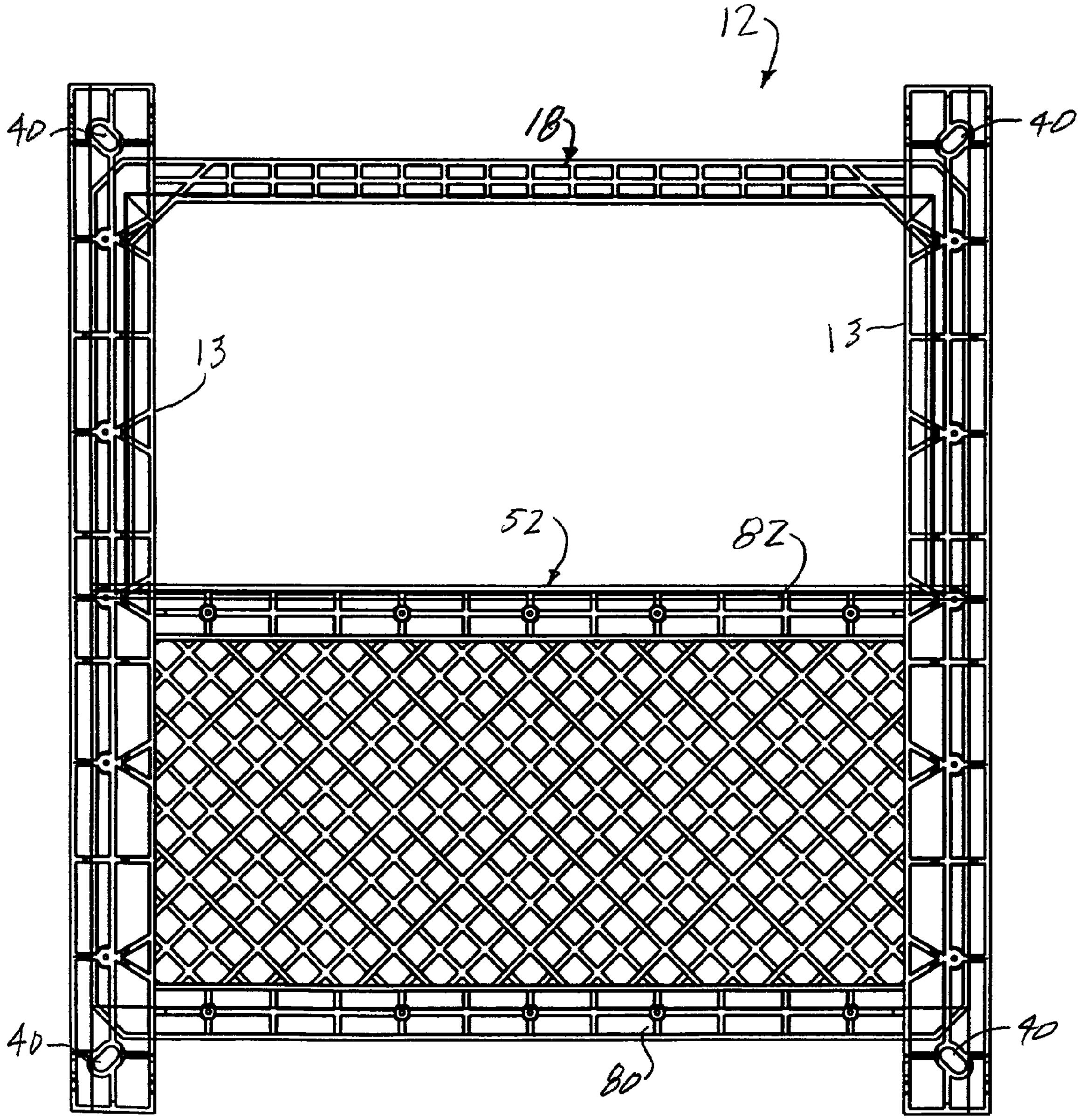
FIG. 6 is a bottom plan view of the base of the invention shown with the bottom plates and weight covers and weights removed.
Figure 8:
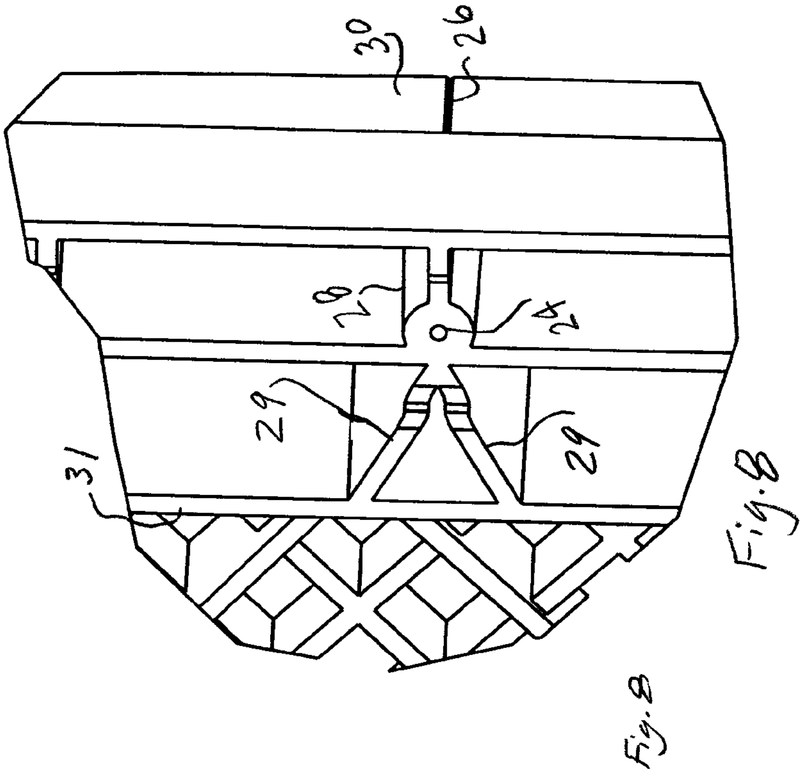
FIG. 8 is a fragmentary detail view of the indicated portion of FIG. 7.

Referring to FIGS. 2-4, when the base 12 is used as the base of a restroom, the deck 18 defines an opening 62 at its rear, behind the floor 52, in which the holding or septic tank 63 (FIG. 1) is placed. The bottom of the septic tank 63 is sloped so that its lowest point is right beneath the seat hole in the top of the tank 63. This is so that the tank 63 can be easily pumped out. To accommodate the sloping bottom wall of the tank 63, the top edges that define the opening 62 are slanted inwardly toward the ground as shown in FIGS. 3 and 4 at 64, 66, 68, and 70. In addition, where the slanted edge 68 at the rear of the base meets the slanted side edges 66 and 70, the corners 72 and 74 are triangular-shaped (in top plan view) to give the corners strength and dimensional stability. Since the corners 72 and 74 are formed by the slanted surfaces 68/66 and 68/70, they funnel toward the center of the opening 62 with the intersection between the surfaces 66 and 68 and between the surfaces 70 and 68 defined by junction lines 76.

Figure 7:
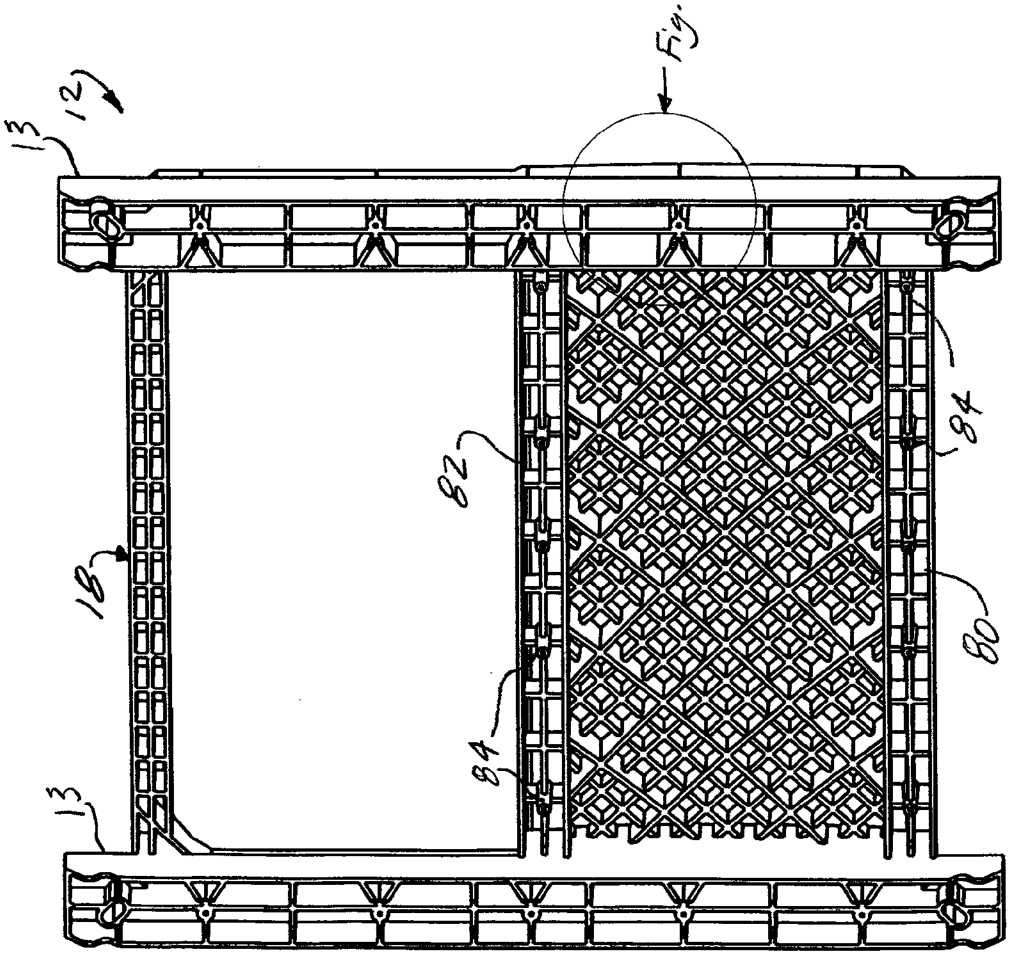
FIG. 7 is a bottom perspective view of the base.
Figure 9:
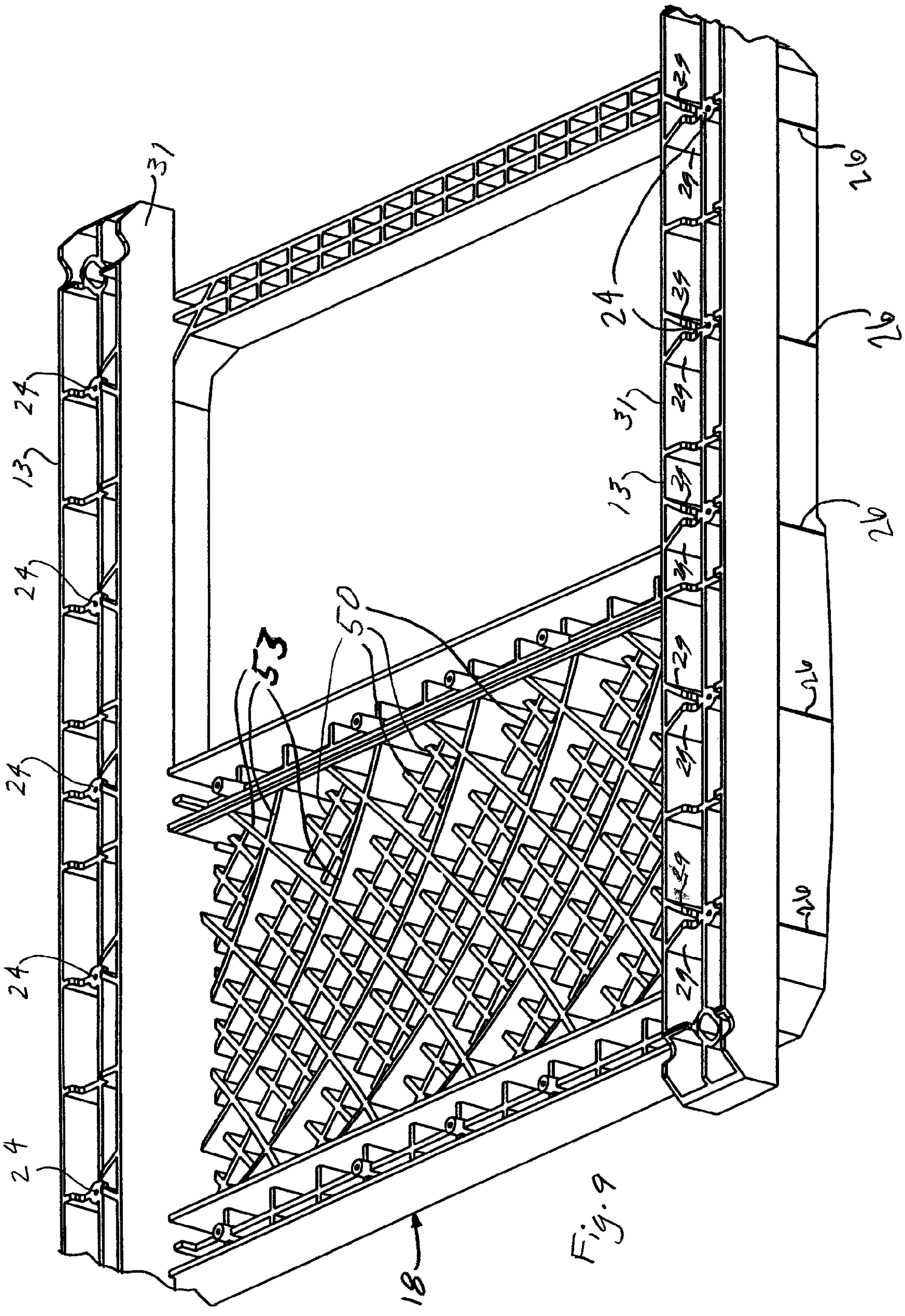
FIG. 9 is a bottom plan view of the base illustrating the rib pattern of the deck and other features.
Figure 11:
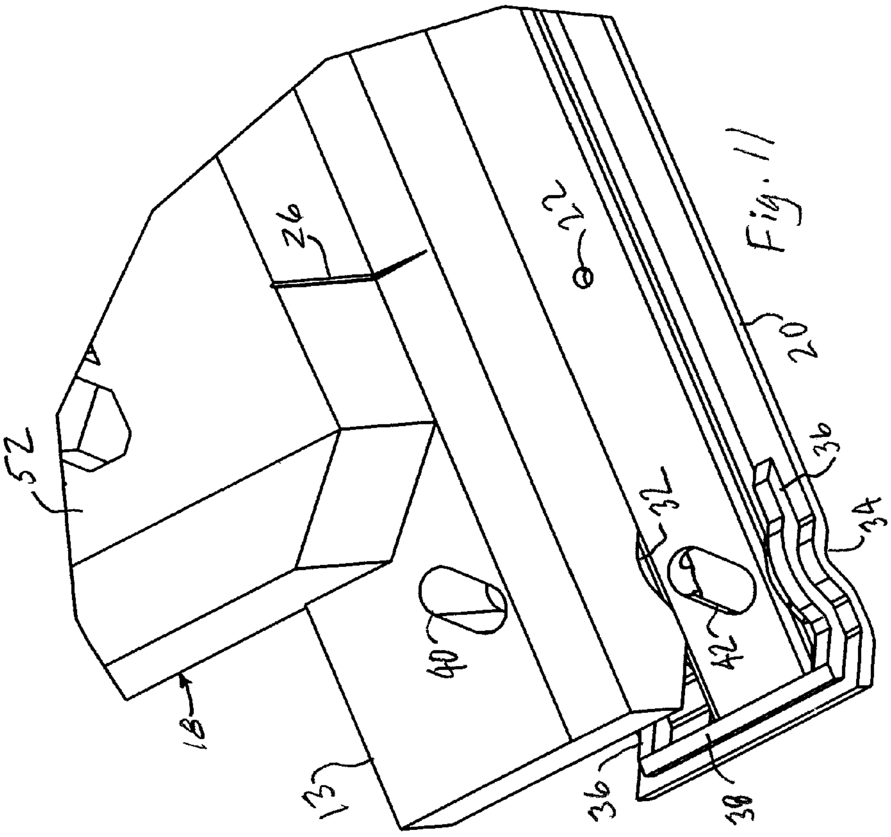
FIG. 11 is a detail view of the indicated portion of FIG. 10.
Figure 10:
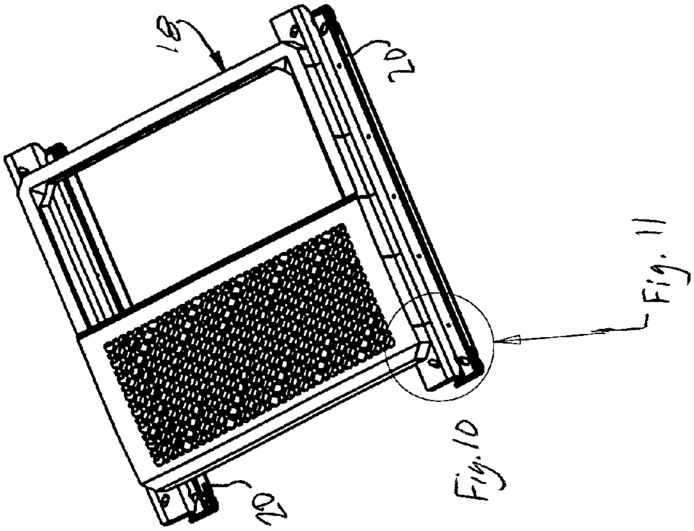
FIG. 10 is a perspective view illustrating the bottom plates exploded from the runners of the base.
Figure 22:
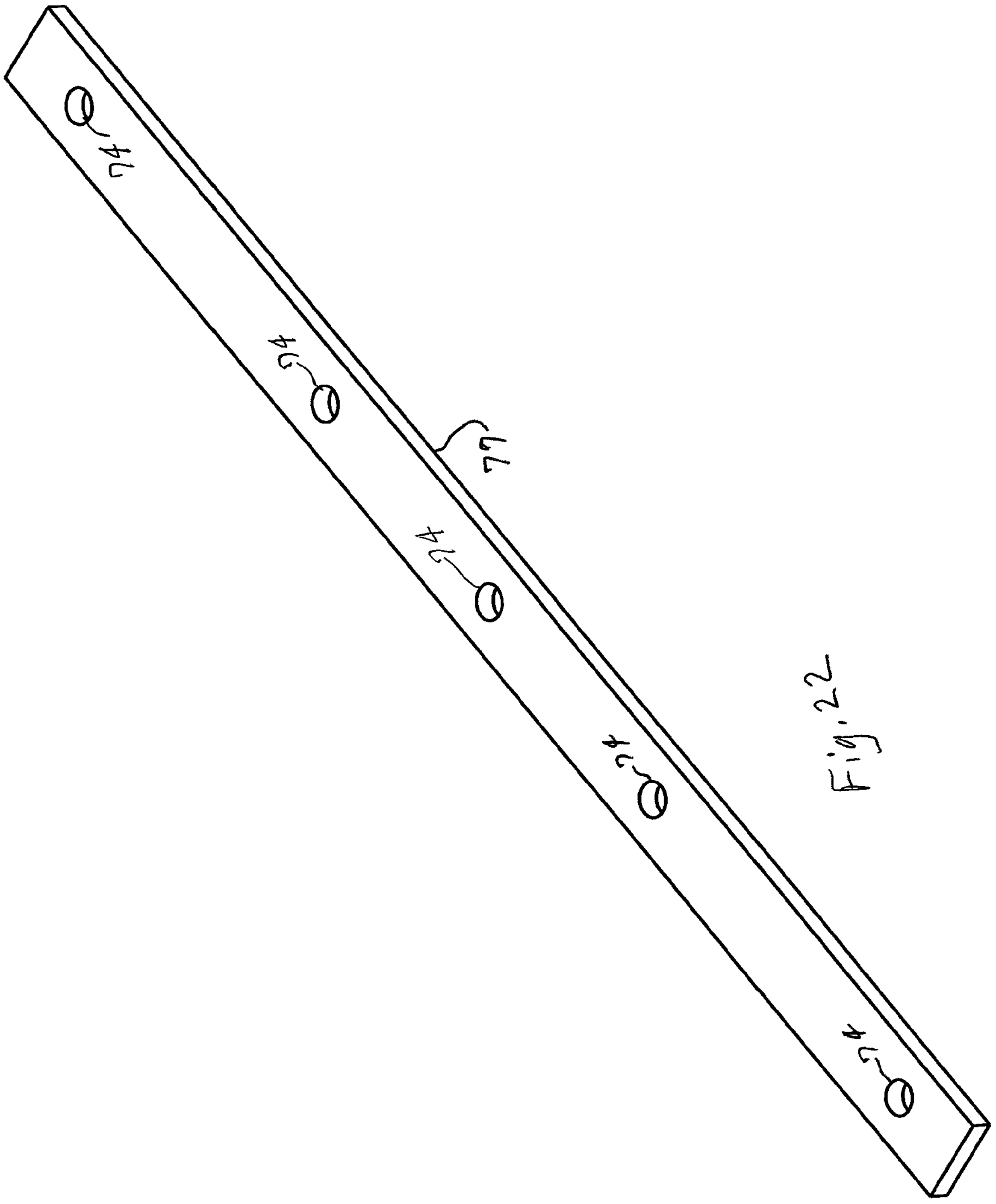
FIG. 22 is a perspective view of the weights.

Referring to FIGS. 7, 21 and 22, for those applications where it is desired that the base 12 be made heavier, weights 77 may be added into the laterally running openings 80 and 82 formed at the respective front and rear edges of the floor 52 and which open toward the bottom of the base 12. Forming these is another advantage of molding the base 12 with a parting line between the mold halves which is generally horizontal with respect to the normal use of the base 12. The openings 80 and 82 each are formed with a number of bosses 84 that match the holes 74 formed in bar weights 77 (FIGS. 21 and 22) which are made of iron, steel, or another heavy material. Self threading fasteners 73 (two shown at the rear in FIG. 21) extend through the holes 74 into the bosses 84 to secure the weights 77 in the recesses 80 and 82. Covers 71 (FIG. 21) may also be provided for the openings 80 and 82, which as stated above may be formed in the same mold as the base 12 and wear plates 20, and may be secured over the openings in 80 and 82 by the same fasteners 73 that secure the weights.

A base of the invention has its runners formed integral with the deck and other structural components of the base in a molding process which forms all of the recesses of the deck and runners opening downwardly. This enables using ribs, bosses, and draft angles in the recesses which are not visible to users and which contribute to an efficient, economical, high-strength, and rigid molded base.

A preferred embodiment of the invention has been described in considerable detail including many particular preferred features. Many modifications and variations to the preferred embodiment described, and to the features of it, will be apparent to a person of ordinary skill in the art. Therefore, the invention should not be limited to the embodiments described or to the particular features of it, but should be defined by the claims which follow.

I claim:

1. A method of making a skid base for supporting a resin building thereon in which the skid base has a deck and at least two runners that are essentially parallel and spaced apart and extend beneath the deck essentially the length of the skid base, the method comprising:

providing a mold;

injecting structural foam material into the mold so as to define a single-wall structure, having an outer side and an underside joined by a continuous thickness of the structural foam material, which forms the deck and runners integrally together such that the outer side of the wall structure forms an outer surface of the deck and runners and the underside of the wall structure forms a bottom surface of the deck and runners, the bottom surface forming an open bottom at the deck and runners which opens to a bottom side of the base, the bottom surface at the runners being disposed closer to the bottom side of the base than the bottom surface at the deck; and forming a grate floor area in the deck with openings between ribs integrally molded within the deck.

2. The method of claim 1, wherein a first mold part defines the outer surface of the deck and runners, and wherein a second mold part defines the bottom surface of the deck and runners.

3. The method of claim 1, wherein the structural foam material is high density polyethylene structural foam.

4. The method of claim 1, further including forming at each end of the runners a stake down slot of an elongated shape, each slot being diagonal so that a stake may be driven through the slot at an angle toward the center of the skid base beneath the skid base at each corner of the base.

5. The method of claim 1, wherein the openings in the grate are tapered such that they are larger at a bottom of the deck than at a top of the deck.

6. The method of claim 1, wherein at least some of the ribs that form the grate are of different heights.

7. The method of claim 6, wherein at least some of the ribs that form the grate are of a greater height at a perimeter of the deck than at a center of the deck.

8. The method of claim 1, wherein at least some of the ribs that form the grate run at an angle with respect to a front side of the deck.

9. The method of claim 1, further including forming fastener indicators in the outer surface of the skid base for threaded fasteners that fasten wall panels to the skid base.

10. The method of claim 9, wherein the wall structure is thicker at the locations of the indicators.

11. The method of claim 10, further including forming bosses in the runners at the locations of the indicators that provide fastening points for wear plates that cover the open bottoms of the runners.

12. A method of making a skid base for supporting a resin building thereon in which the skid base has a deck and at least two runners that are essentially parallel and spaced apart and extend beneath the deck essentially the length of the skid base, the method comprising:

providing a mold;

injecting structural foam material into the mold so as to define a single-wall structure, having an upper side and an underside joined by a continuous thickness of the structural foam material, which forms the deck and runners integrally together and with an open bottom which opens to a bottom side of the skid base, wherein the wall structure has no upwardly facing or downwardly facing surfaces between the upper side and the underside of the wall structure, wherein the runners extend closer to the bottom side of the skid base than the deck; and forming a grate floor area with openings between ribs integrally molded within the deck.

13. The method of claim 12, wherein at least some of the ribs that form the grate are of different heights, being of greater height at a perimeter of the deck than at a center of the deck.

14. The method of claim 12, wherein at least some of the ribs that form the grate run at an angle with respect to a front side of the deck.

15. The method of claim 12, wherein the openings in the grate are tapered such that they are larger at a bottom of the deck than at a top of the deck.

16. The method of claim 12, further including attaching wear plates to the skid base over the open bottoms of the runners.

17. A method of making a skid base for supporting a resin building thereon in which the skid base has a deck and at least two runners that are essentially parallel and spaced apart and extend beneath the deck essentially the length of the skid base, the method comprising:

providing a mold;

injecting structural foam material into the mold so as to define a single-wall structure, having an upper side and an underside joined by a continuous thickness of the structural foam material, which forms the deck and runners integrally together such that the upper side of the wall structure forms upper surface of the deck and runners and the underside of the wall structure forms bottom surface of the deck and runners, the bottom surfaces forming an open bottom at the deck and runners which opens to a bottom side of the skid base, wherein there are no upwardly facing or downwardly facing surfaces between the upper surfaces of the deck and runners and the bottom surfaces of the deck and runners, the bottom surfaces at the runners being disposed closer to the bottom side of the skid base than the bottom surfaces at the deck; and forming a grate floor area with openings between ribs integrally molded within the deck.

18. The method of claim 17, wherein at least some of the ribs are of a greater height at a perimeter of the deck than at a center of the deck.

19. The method of claim 17, wherein the openings in the grate are tapered such that they are larger at a bottom of the deck than at a top of the deck.

20. The method of claim 17, further including attaching wear plates to the skid base over the open bottoms of the runners.

* * * * *

UNITED STATES PATENT AND TRADEMARK OFFICE

CERTIFICATE OF CORRECTION

PATENT NO. : 8,092,728 B2
APPLICATION NO. : 12/122445
DATED : January 10, 2012
INVENTOR(S) : Lance T. Hampel It is certified that error appears in the above-identified patent and that said Letters Patent is hereby corrected as shown below:

Col. 8, Claim 17, Line 44, change “surface” to --surfaces--.

Col. 8, Claim 17, Line 46, change “surface” to --surfaces--.

Signed and Sealed this
Twentieth Day of March, 2012

David J. Kappos
*Director of the United States Patent and Trademark Office*